United States Patent [19]

Held, III

[11] Patent Number: 5,476,411

[45] Date of Patent: Dec. 19, 1995

[54] AQUEOUS COMPOSITION FOR WET SANDING OF DRIED PAINT, PLASTICS, AND THE LIKE

[75] Inventor: Theodore D. Held, III, Grosse Pointe Farms, Mich.

[73] Assignee: Henkel Corporation, Plymouth Meeting, Pa.

[21] Appl. No.: 93,123

[22] Filed: Jul. 16, 1993

[51] Int. Cl.$^6$ .................................................. B24C 1/00
[52] U.S. Cl. .......................... 451/36; 451/39; 252/174.22
[58] Field of Search ................. 51/299, 304, 317, 51/321; 252/170, 174.21, 174.22; 451/36, 39, 40; 83/53, 177

[56] References Cited

U.S. PATENT DOCUMENTS

| | | | |
|---|---|---|---|
| 4,087,943 | 5/1978 | Perry | 451/36 |
| 4,101,457 | 7/1978 | Place et al. | 252/174.12 X |
| 4,830,783 | 5/1989 | Ellis et al. | 252/174.25 |
| 4,840,746 | 6/1989 | Shiozaki et al. | 252/174.25 |
| 5,136,818 | 8/1992 | Bramson | 451/36 X |
| 5,363,603 | 11/1994 | Miller et al. | 451/39 X |

FOREIGN PATENT DOCUMENTS

| | | | |
|---|---|---|---|
| 6088483 | 7/1981 | Japan | 51/304 |
| 2133399 | 5/1990 | Japan | 451/36 |
| 0929681 | 5/1982 | U.S.S.R. | 51/304 |
| 1018956 | 5/1983 | U.S.S.R. | 51/304 |
| 1131892 | 12/1984 | U.S.S.R. | 51/304 |
| 1234174 | 5/1986 | U.S.S.R. | 51/304 |
| 1362738 | 12/1987 | U.S.S.R. | 51/304 |

*Primary Examiner*—Joseph M. Gorski
*Attorney, Agent, or Firm*—Ernest G. Szoke; Wayne C. Jaeschke; Norvell E. Wisdom, Jr.

[57] ABSTRACT

An aqueous liquid composition containing glycerin and polyethylene glycol with a molecular weight in the range of about 400 to about 1000, and, optionally, additional surfactant, is an excellent liquid auxiliary for wet sanding and produces a sanding mud that can easily be removed by washing with water, even after drying.

20 Claims, No Drawings

AQUEOUS COMPOSITION FOR WET SANDING OF DRIED PAINT, PLASTICS, AND THE LIKE

FIELD OF THE INVENTION

This invention relates to an aqueous liquid composition that is substantially free from volatile organic compounds ("VOC") and is useful directly as, or can be diluted with water to make a liquid useful directly as, the liquid auxiliary for wet sanding of organic surfaces such as the surfaces of various structural plastics and plastic sheet materials, including but not limited to polyolefins, polycarbonate esters, polyacetals, polyamides, filled thermosetting polyesters, and the like and also such organic surfaces as dried and/or cured paint, lacquer, primer, and like protective coating materials that comprise an organic binder and usually also pigment and/or dye and optionally fillers.

BACKGROUND OF THE INVENTION AND RELATED ART

In order to achieve the desired degree of surface finishing quality, it is often necessary to smooth or polish the surface of plastics and of dried and/or cured coatings of paints and like materials, particularly intermediate coats that are to be covered by another coating of paint or lacquer. This smoothing and/or polishing is most commonly accomplished by abrasive finishing or sanding, using an abrasive such as silicon carbide, garnet, iron oxide, or aluminum oxide, either in the form of a coated abrasive in which the abrasive grits are attached to some flexible backing or in a slurry of the abrasive grits with some liquid. If a coated abrasive is used, it is customary to utilize a liquid auxiliary during the sanding operation, in order to achieve optimum surface quality and avoid the generation of excessive dust, which would at best be annoying, and at worst could be seriously hazardous, to workers performing the sanding; dust could also damage wet protective coating materials on processed parts in the vicinity of the sanding operation by settling on the wet coatings and thereby making the surface rough when it is desired to be smooth. Therefore, whether a coated abrasive or a slurry is used initially, by the completion of the sanding operation the smoothed surface is normally covered with a mixture of a liquid carrier and suspended finely divided abrasive and solid organic particles. This mixture is commonly called "sanding mud" or simply "mud" in the abrasive art.

Before subsequent finishing operations, the sanding mud normally should be removed from the surface. Water or a water based rinse liquid is usually used to accomplish this removal, and sometimes power washing of the rinse liquid is used to assist in removing the sanding mud. In many instances, not even power washing will satisfactorily remove the sanding mud, so that hand rubbing or wiping, with substantial expense that would preferably be avoided, is required in order to achieve adequate surface quality.

In many instances in the prior art, a mixture of isopropyl alcohol (hereinafter often abbreviated "IPA") or a conventional dishwashing detergent liquid and water has been used as the sanding liquid auxiliary; water without any special additive is also frequently used. These types of liquid auxiliary have proved to be at least moderately satisfactory when the sanding mud formed in the course of using it is promptly washed away after completion of sanding. However, in certain assembly line manufacturing operations, it has been found that the time between sanding and washing is long enough for the sanding mud formed during use of these types of liquid auxiliary to dry sufficiently to resist ready removal by rinsing, or even by power washing, with water. Even in manufacturing operations where such drying does not occur during operation under most conditions, it can still occur during interruptions of normal processing conditions, such as occur during rest periods for the operators, which may include as much as two-thirds of the time in a day in single worker shift operations, or as a result of mechanical malfunctions of the operations. Also, IPA is of course a regulated VOC. Accordingly, a major object of this invention is to provide a superior aqueous liquid auxiliary for sanding that is substantially free from VOC's and is readily removed by water rinsing, even after substantial times of exposure to normal ambient air. Another object is to provide a technically satisfactory aqueous liquid auxiliary containing only ingredients that are harmless to human skin, in view of the virtual practical impossibility of preventing contact between the liquid auxiliary used in wet sanding by hand and the skin of the workers performing the sanding. Other objects will be apparent from the description below.

DESCRIPTION OF THE INVENTION

Other than in the operating examples and claims, or where otherwise expressly indicated, all numbers expressing conditions of use or quantities of ingredients used herein are to be understood as modified in all instances by the term "about" in describing the broadest aspects of the invention. Practice within the numerical limits given is generally preferred, however. Also, unless expressly stated to the contrary: percent values are by weight; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; specification of materials in ionic form implies the presence of sufficient counterions to produce electrical neutrality for the composition as a whole; and any counterions thus implicitly specified should preferably be selected from among other constituents explicitly specified in ionic form, to the extent possible; otherwise such counterions may be freely selected, except for avoiding counterions that act adversely to the stated objects of the invention.

SUMMARY OF THE INVENTION

One major embodiment of the present invention is a sanding liquid auxiliary composition that comprises, preferably consists essentially of, or most preferably consists of, water and:

(A) from 1.0 to 50%, preferably from 5.0 to 25%, more preferably from 10.0 to 20%, or still more preferably from 13.0 to 18.0%, of dissolved polyol molecules selected from the group consisting of molecules that include from 2–6 carbon atoms and at least two-thirds as many hydroxyl groups as carbon atoms, preferably with no other atoms than carbon, hydrogen, and oxygen, independently preferably with at exactly as many hydroxyl groups as carbon atoms, most preferably glycerin; and (B) from 0.5 to 40%, preferably from 0.8 to 16%, more preferably from 1.0 to 10%, or still more preferably from 2.0 to 6.0%, of dissolved hydroxy terminated polyoxyethylene (also called "polyethyleneglycol") having a weight average molecular weight in the range from 200 to 4000, preferably in the range from 300 to 1900, or more preferably in the range from 400 to 1000; and, optionally, (C) from 0.01 to 5%, preferably from 0.1 to 4%, or more preferably from 0.5 to 2.5% total of surfactant not within the scope of components (A) and (B), preferably alkylpolyglucoside surfactant.

An alkyl polyglucoside is a compound of the formula I:

$$R^1O(G)_n \qquad (I)$$

where $R^1$ is a monovalent organic moiety containing from one to 30 carbon atoms; G represents a divalent moiety (except for one monovalent terminal moiety) derived from a reducing saccharide containing 5 or 6 atoms by removing hydrogen atom(s) therefrom; and n is a number having an average value from 1 to 6.

Compositions as described immediately above are "working" compositions, i.e., they are suitable for direct use as an auxiliary by application to an organic surface before the surface is sanded. A composition of the invention can also be provided as a concentrate intended for dilution with water before use. Other embodiments of the invention include a process of using a composition according to the invention for a sanding liquid auxiliary and a sanding process using a composition according to the invention as liquid auxiliary.

DESCRIPTION OF PREFERRED EMBODIMENTS

Preferably all the ingredients of the compositions according to the invention are selected from materials with well-established harmlessness to human skin. Hypoallergenic materials such as glycerin and alkyl polyglucosides are especially preferred for this reason among others.

Preferably the ratio by weight between component (A) and component (B) in a composition according to this invention is within the range from 30:1 to 1:1, more preferably within the range from 10:1.0 to 2.0:1.0

Preferably a composition according to the invention does not substantially swell or dissolve the organic solid to be sanded. This property can conveniently be checked by placing a few drops of the composition on a sample of the surface to be sanded, allowing the drops to remain in place on the surface for at least eight hours, and then rinsing off the composition and examining the surface for visible damage. Most preferably, no change in the surface to be sanded is observable with the unaided eye after this test. In some cases, however, a faint haziness is observable in the tested surface after such an extended test, without any significant harm to the performance of the composition that causes the haze in practical use. Compositions that leave the surface to be sanded visibly swollen, blistered, and/or tacky are preferably avoided.

Individual components can be tested in the same way as described above for the compositions, if the individual components are liquid, or in concentrated solutions if the components are solids at the intended sanding temperature. Most surfactants tested have been found to promote swelling of the surfaces to be sanded, but alkyl polyglucosides are exceptional in lacking any such detrimental tendency. If a surfactant is needed or preferred in the composition, therefore, this class of surfactants is preferred.

The most common reason for using a surfactant is to promote spreading of the liquid auxiliary over the surface to be sanded. The amount of surfactant used, if any, preferably is sufficient to cause a contact angle between the liquid auxiliary and the surface to be sanded that is, with increasing preference in the order given, no more than 95, 35, 20, 12, or 6, degrees.

The amount of liquid auxiliary material needed for effective sanding can not be exactly specified, but it can readily be determined by those of ordinary skill in the art, taking account of the amount of sanding to be done and the nature of the substrate being sanded, with some slight experimentation possibly being required. It is believed that the minimum amount of active substances (i.e., components (A), (B), and (C) if used) in the liquid auxiliary needed for effective operation according to the invention may be correlated with the surface area of sanding swarf produced, analogously to the well known phenomenon of the "oil demand" of paint pigment particles. As a general guideline, however, for a working liquid. auxiliary composition containing 20% of active ingredients, an amount of liquid auxiliary corresponding to at least 25 milliliters ("ml") per square meter ("$m^2$") of surface to be sanded is preferred, an amount of at least 125 ml/$m^2$ is more preferred, and an amount of at least 350 ml/$m^2$ is still more preferred, when the surface is sanded with abrasive grits having a standard grading size of 400 to 600 (corresponding to median particle sizes from 30 to 15 microns). For more or less concentrated liquid auxiliaries, the amount of liquid auxiliary can be adjusted accordingly to provide the same amount of active ingredient per unit area of surface sanded.

Polyethylene glycols sold by Dow Chemical Company under the trade name of POLYGLYCOL E and by BASF under the trade name PLURACOL are among those useful in the practice of the invention and readily available. Polyethylene glycols have the formula $H(OCH_2CH_2)_nOH$, and those where n on average is in the range of about 4 to about 11 are most useful for component (B) of a composition according to the invention. In the commercially available polyethyleneglycols the trade name is usually followed by a number which corresponds to the average molecular weight of the product, and this convention is followed herein, using the generally art recognized abbreviation "PEG" for polyethyleneglycols, instead of the specific trade name. For example, for PEG 400, n=8.2–9.1, and the molecular weight, which is to be understood herein as weight average molecular weight, would be about 400.

Component (C) when used is preferably selected from nonionic and/or amphoteric (also called "ampholytic") surfactants only. Commercial surfactants such as TRITON® DF-54 (modified polyethoxy adduct), TRITON® DF12 (modified polyethoxylated linear alcohol); Triton® DF-16 (a terminated ethoxylated linear alcohol), products of Union Carbide Corporation; MAKON® NF-12 (an alkylphenoxy-polyoxyethylene alcohol) manufactured by Stepan Company; and PLURONIC® L62 (a polyoxyethylene polyoxypropylene block copolymer) manufactured by BASF Wynadotte Corporation are examples of nonionic surfactants that can be used for component (C). Typical useful amphoteric surfactants include the following commercially available products: MONATERIC® CyNa50, a 50% active solution of the sodium salt of 2-caprylic-1-(ethyl beta oxypropionic acid)-imidazoline by Mona Industries, and ALKAWET® LF, a proprietary amphoteric surfactant blend manufactured by Lonza. However, as already noted, the most preferred surfactants are the (nonionic) alkyl polyglucosides, which are commercially available from Henkel Corporation under the trade name APG®.

As already noted briefly above, the process according to this invention is most useful when some time elapses between the completion of sanding and the removal of the sanding mud from the sanded surface. With increasing preference in the order given, therefore, it is preferred that a process according to this invention include a time delay of at least 0.5, 1.0, 2.5, 4.6, 7.1, 12.0, 20, or 30 minutes between the completion of sanding and the beginning of rinsing to remove sanding mud from the sanded surface.

The practice of the invention can be further appreciated from the following nonlimiting examples and comparison examples.

EXAMPLES GROUP I

Three working compositions according to the invention were prepared with the ingredients shown in Table 1.

TABLE I

| Ingredient | Percent of Ingredient in Example No.: | | |
|---|---|---|---|
| | 1 | 2 | 3 |
| Glycerine | 18.0 | 14.0 | 13.0 |
| PEG 400 | 2.0 | — | 1.0 |
| PEG 1000 | — | 4.0 | 5.0 |
| MONATERIC® CyNa50 | — | 2.0 | — |
| APG ® 325 | — | — | 1.0 |

The composition of Example 1 remains as a bead when placed on a typical dried primer coat surface, having an estimated contact angle of at least 90°. The composition of Example 2 spreads spontaneously over the same surface, having a contact angle not much more than 0°. The composition of Example 3 is intermediate in wetting power between the other two.

All three compositions were tested on panels precoated with U04AD045 gray primer from BASF Corporation and on other panels precoated with "80° Gloss" RIM primer from PPG Corp. When ten drops of each formulation (having a total volume of 0.5 ml) were applied to a surface area of 5 square centimeters on each panel, excellent sanding lubrication was achieved when sanding with 3M Type 286 L Grit 400 Waterproof coated abrasive paper. The sanding mud was allowed to stand for 8 hours in air at 43° C. and 60% relative humidity ("RH"). The sanding mud from Example 1 was very quickly washed away from the PPG primer with ordinary rinsing only, but a slight amount of sanding mud was left on the other panels tested after such ordinary rinsing, with the least amount left on panels with the formulation of Example 1 and the most with the formulation of Example 2. The sanding mud from all these tests was readily removed by conventional power washing, using a 2% concentration of PARCO® Plastic Cleaner 2501 in water at 57° C. for a contact time of 60 seconds ("sec"), followed by 30 sec rinse with ambient temperature tap water and a second 30 sec rinse with ambient temperature deionized water, and finally blowing dry with compressed air.

All the formulations were separately tested for attack on the substrates, without doing any abrasive finishing, under exposure for 8 hours at 49° C. and 25% RH. The only evidence of attack on the substrate was a very slight slick remnant on the BASF primer with the formulation of Example 1.

EXAMPLE AND COMPARISON EXAMPLE COMPONENTS GROUP II

In this group, various candidate components were tested for possible damage to substrates. A few drops of each component were placed on the surface of test substrates as described further below and allowed to stand for 8 hours in air at 49° C. and 25% RH; then the residue of the liquid auxiliary was rinsed away with 60 seconds of water spraying. The substrates tested and their identifying numbers are:

1. U04AD045 gray primer from BASF Corporation
2. Premix gray SMC primer from Siebert-Oxidermo Corporation
3. XENOY™ polycarbonate/polyester blend plastic from General Electric
4. Red Spot Paint Company type 206LE 2K Polyurethane Topcoat, white
5. "80° Gloss" RIM primer from PPG Corporation.

The components tested and their identifying abbreviations (in parentheses) are: APG® 225 (Apg2) and APG® 325 (Apg3) from Henkel Corp.; PEG 400 (P400), PEG 1000 (P 1000), and PEG 6000 (P 6000); glycerine (GLYC); Triton® DF-16 (DF-16); MAKON® NF-12 (NF-12); MONATERIC® CyNa50 (MON) and PLURONIC®L63 (PLU). The results are shown in Table 2. Only glycerine, APG® surfactants, and PEG 1000 were generally free from any evidence of damage when applied in full strength as in this test, but many of the other components listed can be used in the amounts preferred for working compositions according to the invention, without causing any unacceptable damage to the surfaces sanded.

TABLE 2

| Com- ponent | Evidence of Damage on Substrate No.: | | | | |
|---|---|---|---|---|---|
| | 1 | 2 | 3 | 4 | 5 |
| Apg2 | trace | none | none | none | none |
| Apg3 | none | none | none | none | none |
| P 400 | flat, whitish raised area | shiny raised area | haze damage | whitish raised bump | raised area |
| P 1000 | nm | nm | nm | nm | none |
| P 6000 | nm | nm | nm | nm | none, but dried mud difficult to remove |
| GLY | nm | nm | nm | nm | none |
| DF 16 | slick | shiny raised area | haze damage | whitish raised bump | bump |
| MON | trace | trace | haze damage | slight raised area | raised area |
| NF 12 | glossy raised slick | glossy, slightly raised | haze damage | raised area | raised area |
| PLU | glossy raised slick | glossy, slightly raised | raised area | raised area | raised area |

Note for Table 2:
"nm" means not measured.

COMPARISON EXAMPLES GROUP II

The commercially available dishwashing detergents DAWN®, DOVE®, IVORY CLEAR®, and JOY® were tried at 2% active ingredient concentration in water as wet sanding auxiliary liquids under the same general conditions as described in Groups I and II. All of them proved substantially ineffective in producing sanding muds that could easily be removed after 8 hours drying. If used as supplied, with about 20% active ingredients, or at any concentration down to about 2.5%, these commercial liquid detergents are too viscous to perform satisfactorily as sanding auxiliaries for wet sanding with fine coated abrasive such as Grit 400.

What is claimed is:

1. A sanding liquid auxiliary composition that consists essentially of water and:

(A) from about 1.0 to about 50% of dissolved polyol molecules selected from the group consisting of molecules that include from 2–6 carbon atoms and at least two-thirds as many hydroxyl groups as carbon atoms; and (B) from about 0.5 to about 40% of dissolved hydroxy terminated polyoxyethylene having a weight average molecular weight in the range from about 200 to about 4000; and, optionally, (C) from about 0.01 to about 5% total of surfactant not within the scope of components (A) and (B).

2. A composition according to claim 1, wherein the concentration of component (A) is within the range from about 5.0 to about 25%, the concentration of component (B) is within the range from about 0.8 to about 16%, and the amount of component (C) is at least about 0.01%.

3. A composition according to claim 2, wherein the amount of component (C) is from about 0.1 to about 4% and component (C) is selected from nonionic and ampholytic surfactants.

4. A composition according to claim 3, wherein the concentration of component (A) is within the range from about 10.0 to about 20% and the concentration of component (B) is within the range from about 1.0 to about 10%.

5. A composition according to claim 4, wherein component (A) is selected from molecules including no other atoms than carbon, hydrogen, and oxygen; and component (B) is selected from polyoxyethylene with a weight average molecular weight in the range from about 300 to about 1900.

6. A composition according to claim 5, wherein component (A) is selected from molecules including as many hydroxyl groups as carbon atoms; and component (B) is selected from polyoxyethylene with a weight average molecular weight in the range from about 400 to about 1000.

7. A composition according to claim 6, wherein component (A) is glycerin.

8. A composition according to claim 7, wherein the amount of component (C) is in the range from about 0.5 to about 2.5%.

9. A composition according to claim 8, wherein component (C) is selected from alkylpolyglucoside surfactants.

10. A composition of matter from which a sanding liquid auxiliary composition according to claim 1 can be prepared by dilution with water only.

11. A process for sanding of a surface of plastic or of dried or cured paint utilizing abrasive grits and an auxiliary liquid composition that is in contact with both the surface being sanded and the abrasive grits during sanding, so as to form sanding mud on the sanded surface during sanding, wherein the improvement comprises using an auxiliary liquid composition according to claim 9.

12. A process according to claim 11, including additional steps of allowing the sanding mud produced during sanding to remain on the sanded surface for at least about 2.5 minutes after the completion of sanding, and then rinsing the sanding mud from the surface with an aqueous liquid.

13. A process according to claim 12, wherein the amount of auxiliary liquid composition is at least about 300 ml/m$^2$ of surface sanded.

14. A process for sanding of a surface of plastic or of dried or cured paint utilizing abrasive grits and an auxiliary liquid composition that is in contact with both the surface being sanded and the abrasive grits during sanding, so as to form sanding mud on the sanded surface during sanding, wherein the improvement comprises using an auxiliary liquid composition according to claim 8.

15. A process according to claim 14, including additional steps of allowing the sanding mud produced during sanding to remain on the sanded surface for at least about 2.5 minutes after the completion of sanding, and then rinsing the sanding mud from the surface with an aqueous liquid.

16. A process according to claim 15, wherein the amount of auxiliary liquid composition is at least about 300 ml/m$^2$ of surface sanded.

17. A process for sanding of a surface of plastic or of dried or cured paint utilizing abrasive grits and an auxiliary liquid composition that is in contact with both the surface being sanded and the abrasive grits during sanding, so as to form sanding mud on the sanded surface during sanding, wherein the improvement comprises using an auxiliary liquid composition according to claim 7.

18. A process according to claim 17, including additional steps of allowing the sanding mud produced during sanding to remain on the sanded surface for at least about 2.5 minutes after the completion of sanding, and then rinsing the sanding mud from the surface with an aqueous liquid.

19. A process according to claim 18, wherein the amount of auxiliary liquid composition is at least about 300 ml/m$^2$ of surface sanded.

20. A process for sanding of a surface of plastic or of dried or cured paint utilizing abrasive grits and an auxiliary liquid composition that is in contact with both the surface being sanded and the abrasive grits during sanding, so as to form sanding mud on the sanded surface during sanding, wherein the improvement comprises using an auxiliary liquid composition according to claim 7.

* * * * *